United States Patent
Lewis et al.

(10) Patent No.: US 8,032,910 B2
(45) Date of Patent: Oct. 4, 2011

(54) SYSTEM FOR RECEIVING TRANSPORT STREAMS

(75) Inventors: David Lewis, Bristol (GB); Howard Gurney, Bristol (GB)

(73) Assignee: STMicroelectronics Limited

( * ) Notice: Subject to any disclaimer, the term of this patent is extended or adjusted under 35 U.S.C. 154(b) by 0 days.

(21) Appl. No.: 12/778,413

(22) Filed: May 12, 2010

(65) Prior Publication Data

US 2010/0284408 A1 Nov. 11, 2010

Related U.S. Application Data

(63) Continuation of application No. 10/121,025, filed on Apr. 11, 2002, now abandoned.

(30) Foreign Application Priority Data

Apr. 12, 2001 (EP) .................................... 01303461

(51) Int. Cl.
*H04N 7/20* (2006.01)
*H04N 5/932* (2006.01)
*H04N 5/935* (2006.01)

(52) U.S. Cl. ............ 725/68; 725/63; 725/100; 725/131; 725/139; 725/151; 386/219; 386/220

(58) Field of Classification Search ........................ None
See application file for complete search history.

(56) References Cited

U.S. PATENT DOCUMENTS

| | | | | |
|---|---|---|---|---|
| 5,787,288 | A * | 7/1998 | Nagata et al. | 717/173 |
| 6,477,317 | B1 * | 11/2002 | Itokawa | 386/95 |
| 7,012,932 | B1 * | 3/2006 | Mizobata | 370/487 |
| 2002/0095689 | A1 * | 7/2002 | Novak | 725/151 |

* cited by examiner

*Primary Examiner* — Joseph P Hirl
*Assistant Examiner* — Fred Peng
(74) *Attorney, Agent, or Firm* — Lisa K. Jorgenson; James H. Morris; Wolf, Greenfield & Sacks, P.C.

(57) ABSTRACT

A system comprising first input means for receiving a transport stream from an external source, second input means for receiving an input from a memory, means for connecting the first and second input means to an interface which is arranged to provide an output stream to a decoder. The second input means is arranged to provide an output to the interface in such a form that the interface does not distinguish between the output from the first and second input means.

17 Claims, 6 Drawing Sheets

SYSTEM FOR RECEIVING TRANSPORT STREAMS

This application is a continuation of prior application Ser. No. 10/121,025, filed Apr. 11, 2002, which claims the priority benefit of European patent application number 01303461.6, filed Apr. 12, 2001, which applications are hereby incorporated by reference to the maximum extent allowable by law.

FIELD OF THE INVENTION

The present invention relates to a system for receiving transport streams and in particular but not exclusively to a system for use in a set top box.

BACKGROUND OF THE INVENTION

In digital television systems, the television is provided with a set top box to receive and decode a broadcast digital data stream which contains program information for display on the television. The broadcast digital data stream may arise at the set top box via a satellite or cable system, via a digital terrestrial system, or via disk or tape. A disk or tape, such as a CD ROM in a personal computer, may provide digital video information for display on the monitor.

There are various known standards for digital video broadcasting (DVB) and one now commonly used standard is the MPEG-2 standard.

In the MPEG-2 DVB standard, data is encoded into transport packets. Each transport packet is defined by the standard as consisting of 188 bytes, comprising four header bytes and 184 payload bytes ("the data payload"). For transmission, the transport packets are time division multiplexed into a transport stream. At the receiver in the set top box, the transport stream is demultiplexed to recover the transport packets. Optionally, the transport packets may be scrambled and encoded with error correction information for transmission and then descrambled and error checked at the receiver. The data payload in the transport packets is, according to the MPEG-2 standard, one of two types. The first type is known is a packetised elementary stream (PES), and the second type is known as program specific information (PSI).

The packetised elementary streams (PESs) form the video, audio and private data information of the broadcast. A PES packet may contain all sorts of data, audio or video and also other information such as teletext or other user defined general data. The MPEG-2 transport stream is made up of one or more PESs (either video, audio or private). The MPEG-2 transport stream is primarily intended for the transport of TV programs over long distances. This type of stream can combine, in the same multiplex, many programs, each of them being composed of one or more PESs. In order that the receiver can cope with this mix of program information, the MPEG-2 standard defines all types of tables, which together make up the MPEG-2 program specific information (PSI).

At each decoder or set top box, the transport stream is decoded. To achieve the decoding of the transport stream, each set top box is provided with a transport interface, which provides an input interface between the transport stream input to the box and the actual MPEG-2 decoders which decode the audio and video information and sections broadcast. The transport interface demultiplexes the transport stream to retain only those transport packets, which are required by the particular set top box for decoding. The transport stream is a set of different services time division multiplexed and the purpose of the transport interface is to demultiplex them. At a front input end of the transport interface, a time demultiplex function is performed to separate the transport stream into its component transport packets.

Each transport packet has associated therewith in its header a packet identifier (PID) which identifies the type of packet and various information associated with the data in the packets including the type of packet (PES or PSI). Each particular receiver or set top box is only interested in receiving packets having packet identifiers of interest to the particular set top box, for instance those associated with the particular television program selected for viewing. Thus, once the incoming transport stream has been time demultiplexed to recover the transport packets, it is necessary to further demultiplex the transport packets to retain only those having packet identifiers required by the receiver.

The transport interface merely uses the header of PES transport packets to demultiplex them, and stores the data payload of the demultiplexed packets in the memory. The transport interface similarly demultiplexes PSI transport packets but then filters the sections of the demultiplexed packets to retain only sections required by the receiver, before storing the filtered sections in the memory without further processing.

It has been proposed that the MPEG data may be obtained from a memory instead of via a satellite or cable link. Previously a transport stream could be decoded and stored in memory. To replay that transport stream, it was necessary to use the CD FIFO of the MPEG decoder. This stored transport stream would be treated differently from the received satellite or cable transport stream. This means that the set top box has to have separate circuitry for dealing with the stored and received transport streams.

SUMMARY OF THE INVENTION

It is therefore an aim of embodiments of the present invention to address this. In particular preferred embodiments of the present invention are arranged to permit the replaying of the stored data in a similar way that data from a cable or satellite link is played.

According to one aspect of the present invention there is provided a system comprising first input means for receiving a transport stream from an external source, second input means for receiving an input from a memory, means for connecting the first and second input means to an interface which is arranged to provide an output stream to a decoder, wherein the second input means is arranged to provide an output to the interface in such a form that the interface does not distinguish between the output from the first and second input means.

BRIEF DESCRIPTION OF DRAWINGS

For a better understanding of the present invention and as to how the same may be, carried into effect, reference will now be made by way of example to the accompanying drawings in which.

DETAILED DESCRIPTION OF EMBODIMENTS OF THE PRESENT INVENTION

In the following description the present invention is described with reference to an exemplary embodiment in which an MPEG-2 transport stream is demultiplexed in a programmable transport interface of a receiver in a digital set top box. It will be apparent, however, that the present invention is not limited to such an application and does in fact have broader applicability to other types of digital data and other types of application.

Figure 1:
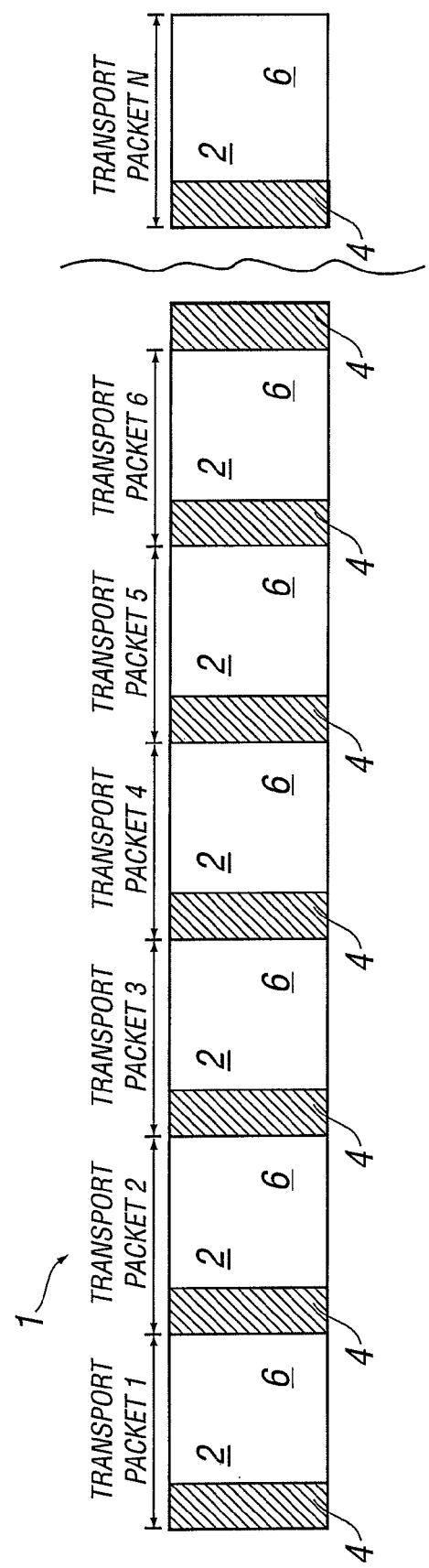
FIG. 1 illustrates a portion of a transport stream.

FIG. 1 illustrates a portion of a transport stream 1 which is composed of a series of n transport packets 2. Each transport packet 2 comprises a transport packet header 4 and a transport packet payload 6. The transport stream is a bit stream which carries in the transport packet payloads 6 information for recreating, for example, a number of different television programs.

The transport stream is formed by source encoding the television programs. The transport stream is then typically channel encoded for transmission (by satellite or cable) and channel decoded on its reception to reproduce the transport stream. The transport stream is then source decoded to recreate a selected one of the different television programs. Each particular television program requires three types of information (audio information, video information and tables of program information) for its recreation. Each transport packet 2 is preferably associated with a particular television program, a particular source encoding time and a particular one of the information types. The individual transport packets are time division multiplexed to form the transport stream and allow the real-time recreation of any one of the different television programs from the transport stream. To recreate a television program the transport stream is sequentially demultiplexed to recover only the transport payloads 6 of audio information, video information and tables of program information which are associated with the selected television program. The recovered payloads are then decoded and used to recreate the television program.

According to the MPEG-2 digital video broadcast (DVB) standard, each of the transport packets 2 is 188 bytes long and the transport packet header 4 is four bytes long. The transport packet payload 6 contains either audio or video information or sections. The sections are parts of tables. The audio and video information and the sections in the payloads 6 are packetised and encoded in accordance with MPEG-2 DVB compression standard.

As will now be described, in embodiments of the present invention, the system is arranged not only to receive MPEG data from a satellite or cable link, the system is also able to receive MPEG data stored on a hard disk, a floppy disk or any other suitable source.

Figure 2:
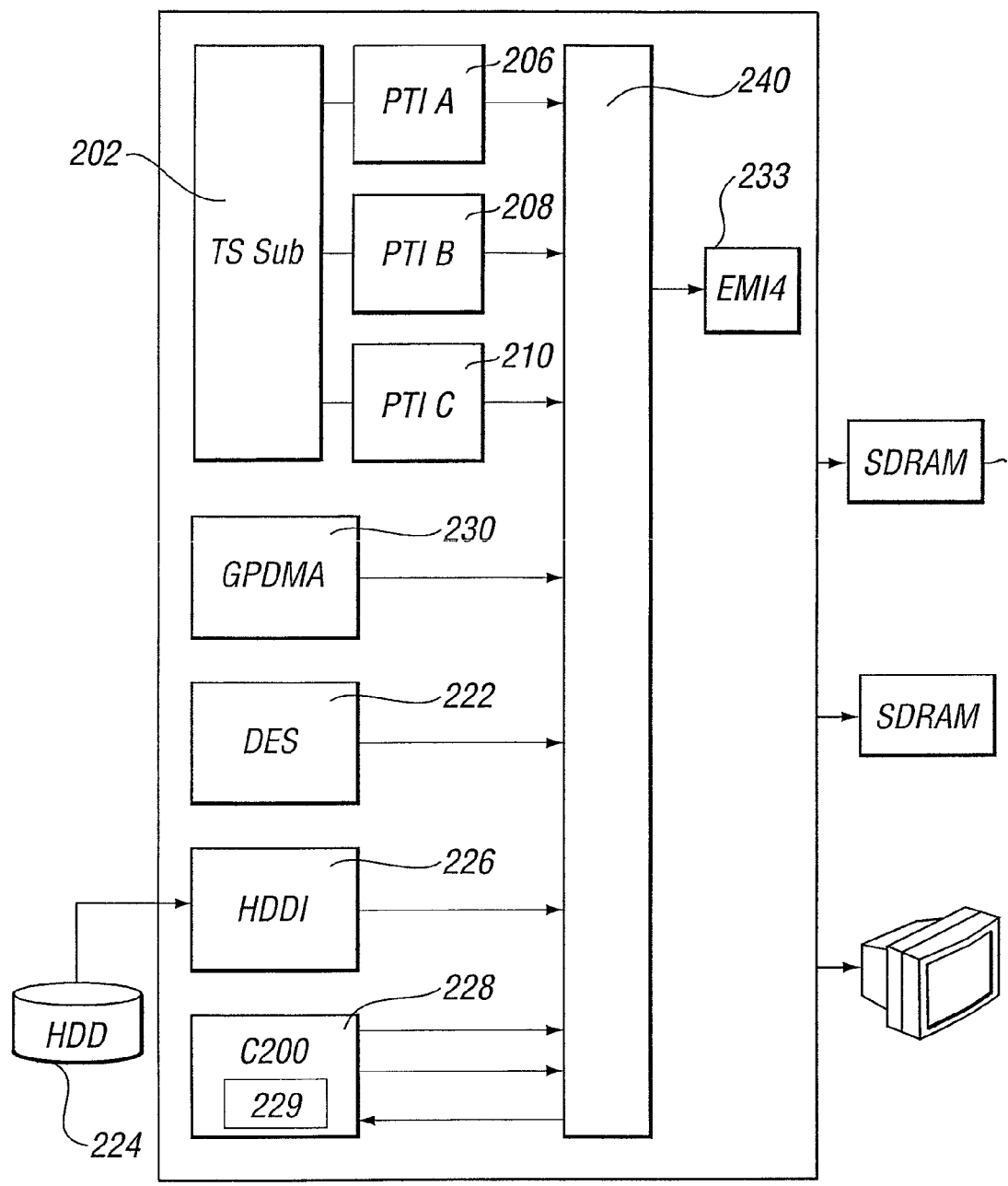
FIG. 2 illustrates a block diagram of a system embodying the present invention.

Reference will now be made to FIG. 2 which shows in schematic form a system embodying the present invention. Transport streams 200 from a cable or satellite link are input to a transport stream multiplexer 202. The transport stream multiplexer 202 has a software register 204. The function of the transport stream multiplexer 202 is to route transport streams from a variety of transport stream sources to a variety of transport stream targets in the form of programmable transport interfaces. The transport stream multiplexer 202 and the software register will be described in more detail hereinafter.

The transport stream multiplexer 202 has three outputs 212 to 216 to respective programmable transport interfaces 206 to 210. Again the programmable transport interfaces will be described in more detail hereinafter. A data encryption standard DES engine 222 is provided. The DES engine 222 performs encryption and/or decryption. This block is capable of performing read/write direct memory access DMA transfers through one of three DES encrypt/decrypt channels.

A hard disk drive 224 is provided. Programs which are to be replayed via the software register 204 are stored on the hard disk drive. The hard disk drive 224 is arranged to interface with the other elements of system via a hard disk drive interface 226.

A CPU 228 is also provided. This CPU 228 may alternatively or additionally be arranged to store programs which can be replayed via the software register 204. The CPU 228 has a SRAM 229 which stores the programs to be replayed.

A GPDMA general purpose direct memory access 230 is provided. The GPDMA 230 can be configured to read blocks of data from one address and write them to another—that is from the hard disk to the transport stream multiplexer 202 and in particular its software register. This can be done with little intervention from the CPU. In particular the CPU just needs to program the GPDMA.

A SDRAM 232 is provided, which is external to the chip. The SDRAM 232 is connected to the system via an external memory interface 233. The SDRAM stores decoded transport streams.

The programmable transport interfaces 206 to 210, GPDMA 230, DES 222, CPU 228, external memory interface 233 and the hard disk drive interface 226 are all connected to an interconnect 240 which allows these elements to communicate with each other.

Figure 3:
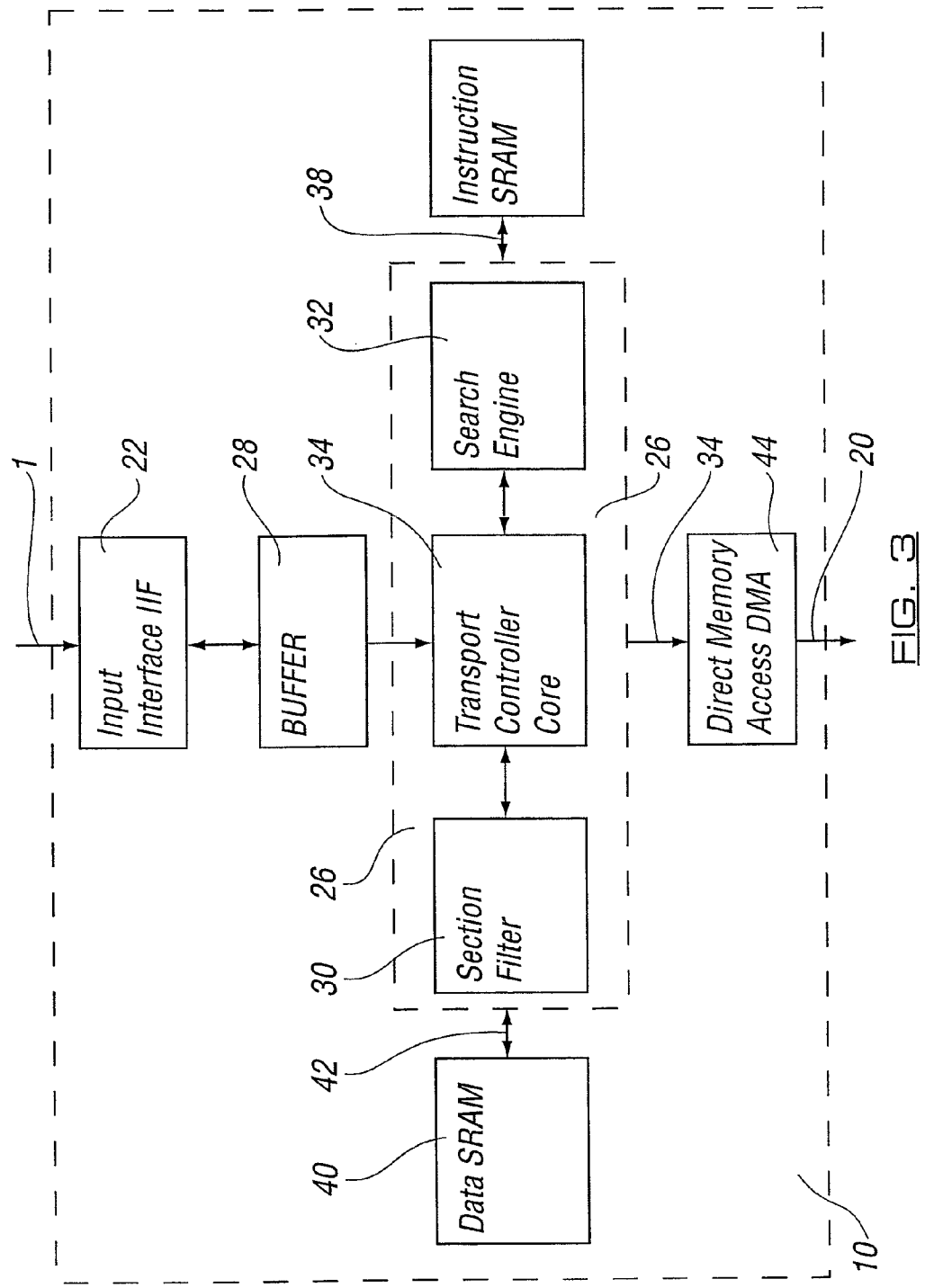
FIG. 3 illustrates in block schematic form one programmable transport interface of FIG. 2.

One of the three programmable transport interfaces of FIG. 2 is shown in more detail in FIG. 3 and is used to process a transport stream 1 and produce a data output stream suitable for reconstitution as a television program after MPEG-2 decoding by MPEG-2 decoders (not shown). The programmable transport interface 10 is included in a receiver which receives the transport stream 1.

The transport packet header contains a synchronisation byte which identifies the beginning of each transport packet 2. The transport packet header also contains a packet identifier (PID) which identifies the information type and the television program associated with the transport packet payload 6. The transport packet 2 also contains information identifying the source encoding time of the transport packet. The transport packet header 4, including the synchronisation byte and the PID, is not scrambled. The transport packet payloads 6 may be scrambled.

The programmable transport interface (PTI) 10 performs various functions including:
1. Using the synchronisation byte to identify the start of the transport packet 2;
2. Using the packet identification (PID) to identify, amongst other functions, the type of information contained in the packet (i.e. audio or video information or sections) and the television program it represents;
3. Descrambling the transport packet payload 6; and
4. Demultiplexing the transport stream 1 to produce a data output stream 20.

The data output stream 20 comprises a stream of audio information associated with the selected television program, a stream of video information associated with the selected television program or tables of program information associated with the selected television program. The PTI outputs the streams to the necessary MPEG-2 decoder to reproduce the selected television program.

The programmable transport interface 10 comprises an input interface. The input interface 22 receives the transport stream 1. The input interface 22 identifies the synchronisation byte of each transport packet which is used to synchronise the system clock and the transport stream. The input interface 22 is controlled by the transport core 24 of a transport controller 26 via input interface control signals from the transport controller core to the input interface. The control signals may include a descrambling control signal and output stream control signals.

The input interface 22 provides bits to the transport controller 26 via a buffer 28. The buffer 28 is used to temporarily store data from the input interface, when required. The input interface 22, under the control of the transport controller core 24 descrambles the payload 6 of selected transport packets and supplies selected descrambled payloads to the transport controller 26.

The transport controller 26 comprises a section filter 30 and search engine 32 in addition to the transport controller core 24. The transport controller 26 operates on the bits received from the input interface 22. In particular, the transport controller 26 receives from the input interface 22 the transport packet header 4 of the transport packet 2 arriving at the input interface 22. The transport controller 26 uses the packet identifier in the transport packet header 4 to determine whether the transport packet 2 now entering the input interface is associated with the selected television program for the programmable transport interface 10. If it is not, the received transport packet 2 is discarded. If it is, it controls the input interface 22 to descramble, if necessary, the transport packet payload as described above, and to supply the transport packet payload 6 to the transport controller 26.

The transport controller 26 may pass a payload 6 associated with the audio or video information for the selected program straight to the transport controller output 34. If the payload relates to a section of a table the transport controller may further process the information before providing it at its output 34.

The transport controller core 24 of the transport controller 26 reads instruction sets from an instruction SRAM 36. The transport controller 26 is connected to the SRAM 36 by interconnect 38 and it reads its instructions via that interconnect. A system processor (not shown) may read and write to the instruction SRAM 36. However, the transport controller 26 has preferential access to the instruction SRAM 36 determined by an arbiter (not shown) which arbitrates between accesses by the transport controller 26 and the system processor.

The PTI 10 also comprises a data SRAM 40 which again can be accessed by the transport controller core 24. In particular, data is written to and read from the data SRAM 40 via interconnect 42. The search engine 32 is in the transport controller 26 is also able to read data from the data SRAM 40. The search engine 32 searches the data SRAM 40 for the packet identifiers in the incoming transport packet header 4. If the packet is not to be discarded, then the PID for that packet will have been stored in the data SRAM and is located by the search engine 32 of the transport controller 24. Associated with each packet identifier in the data SRAM 40 is a plurality of pointers, which point to other addresses in the data SRAM where other information associated with the incoming transport is stored.

The search engine retrieves the pointer stored with a particular packet identifier but used by the transport controller core 24. The transport controller core 24 then uses the pointers to access all the information it needs to process the payload of the incoming transport packet. The pointers may, for example, point to descrambling keys for use by the input interface 22, point to addresses for use by a direct memory access controller 44, identify whether the payload is video or audio information or sections, or identify whether the payload is special data to be output on an alternative output etc. Thus, the information obtained from the data SRAM 40 enables the transport controller to control the PTI 10.

The transport controller 26 produces the transport controller output 34 which is supplied to a multi channel direct memory access controller 44. The multi channel direct memory access controller 44 supplies the data output stream 20, indirectly, to the MPEG decoders (not shown).

Figure 4:
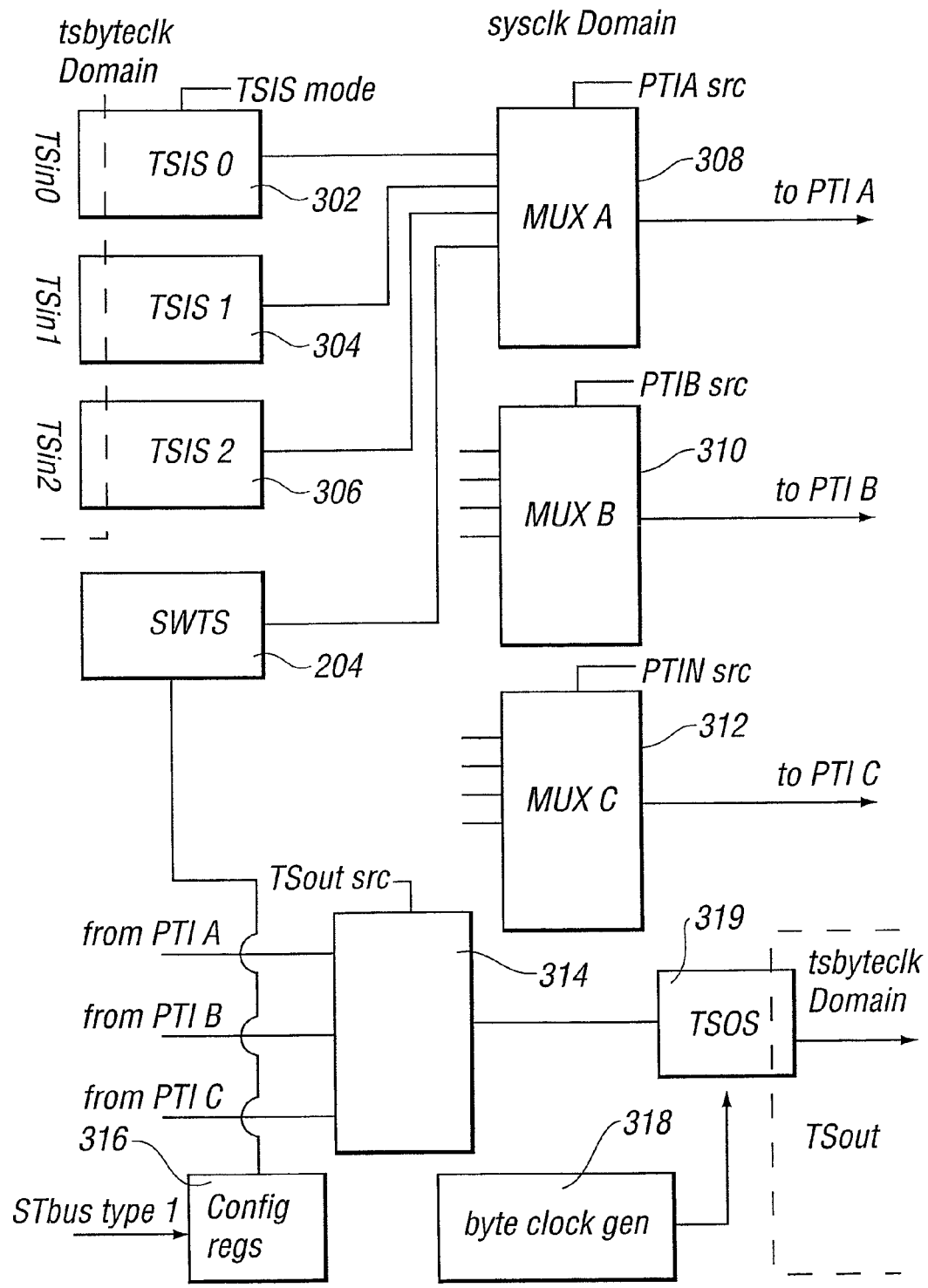
FIG. 4 illustrates the transport stream multiplexer arrangement of FIG. 2 in more detail.

Reference will now be made to FIG. 4 which shows the transport stream multiplexer 202 of FIG. 2 in more detail. The transport stream multiplexer 202 has three transport stream interfaces 302, 304 and 306 through which external transport streams can be brought in. The external transport streams may be from satellite or cable links. The function of the interfaces is to provide an interface between the external transport streams and the rest of the transport stream multiplexer 202. The interfaces synchronise the transport stream to the system clock and convert where appropriate an external serial stream into a byte wide parallel stream. Additional functionality within the interfaces enables an asynchronous or synchronous (to the transport stream byte clock) packet clock from an external transport source to be detected. The interfaces are responsible for converting the streams to the required bus protocol of the system.

A software register 204 is also provided which allows the input of the transport streams from the direct memory access. In other words the software register 204 allows the playback of material which is already stored in a memory or the like. This memory can be any suitable memory as discussed above and may for example be a memory of the CPU, a hard disk drive, a SDRAM, or removable media such as a floppy disk, CDROM or the like. The software register is a software writable transport stream register. This register can be used to copy a transport stream from memory and stream it to any of the programmable transport interfaces 206 to 210.

Figure 5:
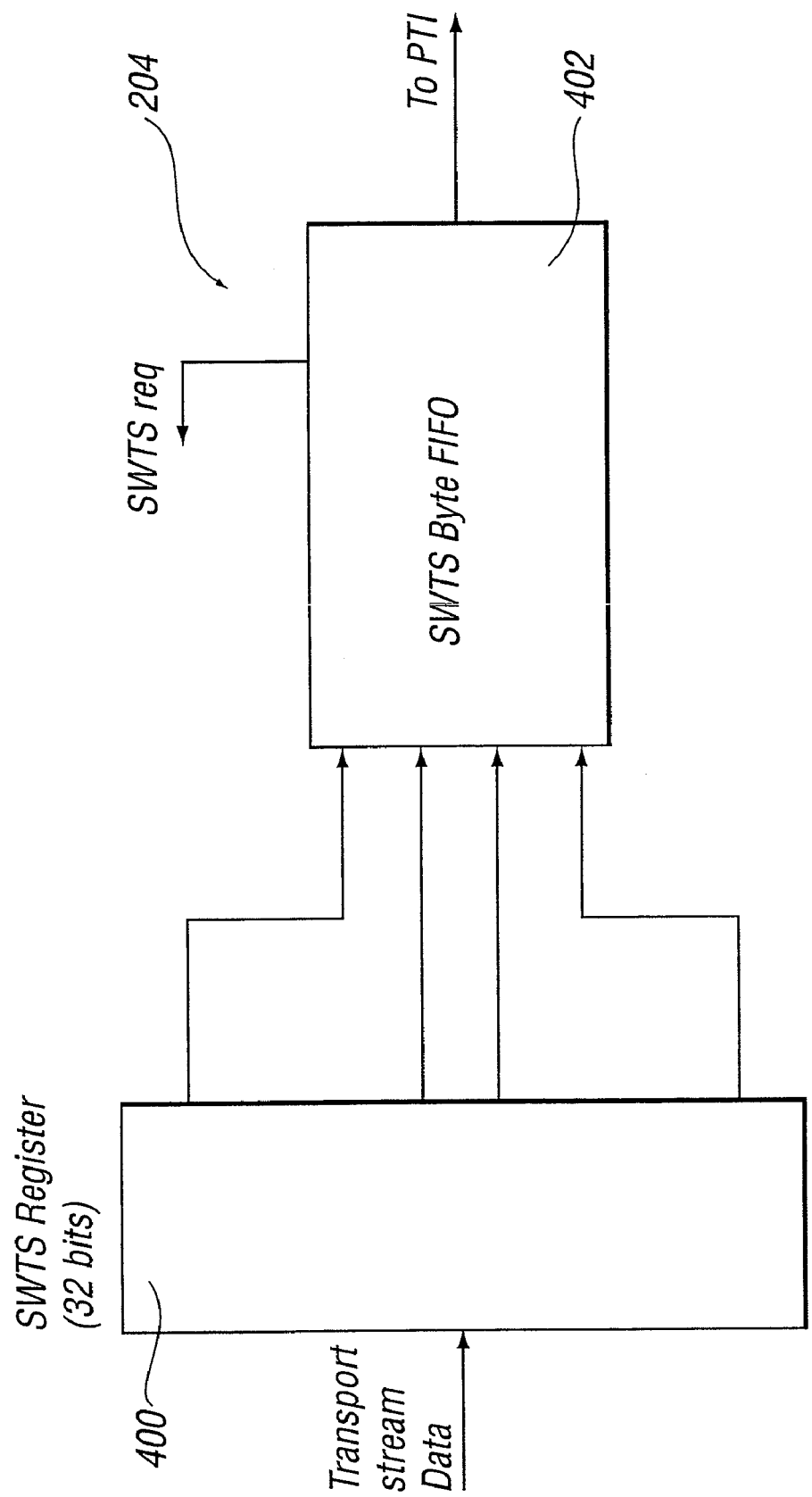
FIG. 5 shows the software register of FIG. 4 in more detail.

The register is shown in more detail in FIG. 5 which will now be described. Bytes or words are written first to a data register 400 by a DMA or CPU or the like. In this embodiment the data register has 32 bits. The written data then gets put into a first-in-first-out FIFO buffer 402 of 32 bytes which is used to buffer the data. The FIFO 402 converts the data into a byte wide transport stream. When there is room for a given minimum number of bytes in the FIFO, a software request flag is asserted which causes more data to be read from the CPU or DMA. In practice the size of the FIFO is determined in accordance with the following equation: half the size of the FIFO=the bit rate multiplied by the time taken to read the transport stream data from the memory and write it to the software register 204 (typically in the order of 1200 ns or 120 system clock cycles).

In this embodiment the maximum bit rate is 100 Mbs (standard maximum transport stream rate). It should be appreciated that these figures are by way of example only and in alternative embodiments of the invention, different values may be use. In this embodiment of the invention, the half size of the FIFO is 15 bytes making a full size FIFO of 32 bytes.

The use of the software register 204 allows transport stream to be stored on the hard disk and then replayed allowing fast forward, rewind and similar functions.

The software request flag is asserted when at least 16 byte locations are available within the FIFO. The request signal will be visible to the software (ie CPU or DMA) via a bit in the software configuration register 316. A valid signal goes to the programmable transport interface which is using the software register. A valid signal means that the byte read from the FIFO is valid. The valid signal will be asserted for one system clock cycle when the pace counter matches the value in the configuration register 316. The pace counter controls the stream data rate going to the programmable transport interface. When the pace counter matches the software configuration value, the valid signal is asserted for one system clock cycle. The pace counter is in the software register. The software configuration value defines the wait states for the software transport stream register.

As soon as there is information in the FIFO, the software register 204 will start outputting it to one of the programmable transport interfaces as is described in more detail hereinafter. The amount of cycles between each valid byte being output by the software register 204 is programmed in the pace register.

The data may have any suitable format. In one embodiment of the present invention, the data output by the software register 204 will be little endian This means that the least significant byte contains the byte which is first output by the software register 204. The user can write words or bytes to the software register 204 and the register 204 will only output valid bytes. On reading the register 204, the returned value, that is the value read by the CPU will either be the current stored value or if empty the latest stored value.

The clock signal used to clock the data out of the software register 204 is generated by the software register 204. This clock goes high for one cycle for each valid byte which comes out of the FIFO.

The software register is designed to be flexible. The programmable transport interface is not able to detect where the data comes from. In other words, the programmable transport interface is not able to determine if the data comes from the hard disk or the like or from a cable or satellite link. The software register can receive decoded or encoded streams.

Returning to FIG. 4, each of the three transport stream interfaces 302 to 306 and the software register 204 can be connected to any one of the three programmable transport interfaces 206 to 210. According the output of each of the three transport stream interfaces 302 to 306 and the software register 204 is connected to three multiplexers 308 to 312. For the sake of clarity, FIG. 4 only shows the outputs to one of the three multiplexers but in practice, the same outputs are provided to all three multiplexers. The first multiplexer 308 is connected to the first programmable transport interface 204, the second multiplexer 310 is connected to the second programmable transport interface 206 and the third multiplexer 312 is connected to the third programmable transport interface 210.

The three multiplexers are controlled by control signals which determine which input transport stream interface 302 to 306 or software register 204 is connected to which programmable transport interface. It should be appreciated that only one, some or all of the transport stream interfaces and the software register may be providing a transport stream. It should also be appreciated that programmable transport interfaces may be able to deal with more than one transport stream at the same time.

The transport stream multiplexer 202 is also arranged to receive a transport stream from any of the programmable transport interfaces 206-210. In this regard an output register 314 is provided which is connected to the outputs of the respective programmable transport interfaces 206-210. The output of the output register 314 is input to a single transport stream output stage 319 which provides an output to a programmable transport interface.

The transport stream multiplexer 202 has a byte clock generator 318 which allows data to be sent off the integrated circuit using an IEEE 1394 interface. The byte clock can be programmed to different frequencies. The transport stream output stage 319 basically retimes data from the programmable transport interface running at the system clock speed to a speed defined by the byte clock and then sent off the integrated circuit. The configuration registers 316 control the following parameters:

the transport stream input stage set up;
the software transport stream register;
the transport stream source for the three programmable interfaces, that is which programmable transport stream interface receives which transport stream;
the transport stream output source, that is which transport stream is output; the source of the transport stream output clock; and
the internally generated clock set up.

Figure 6:
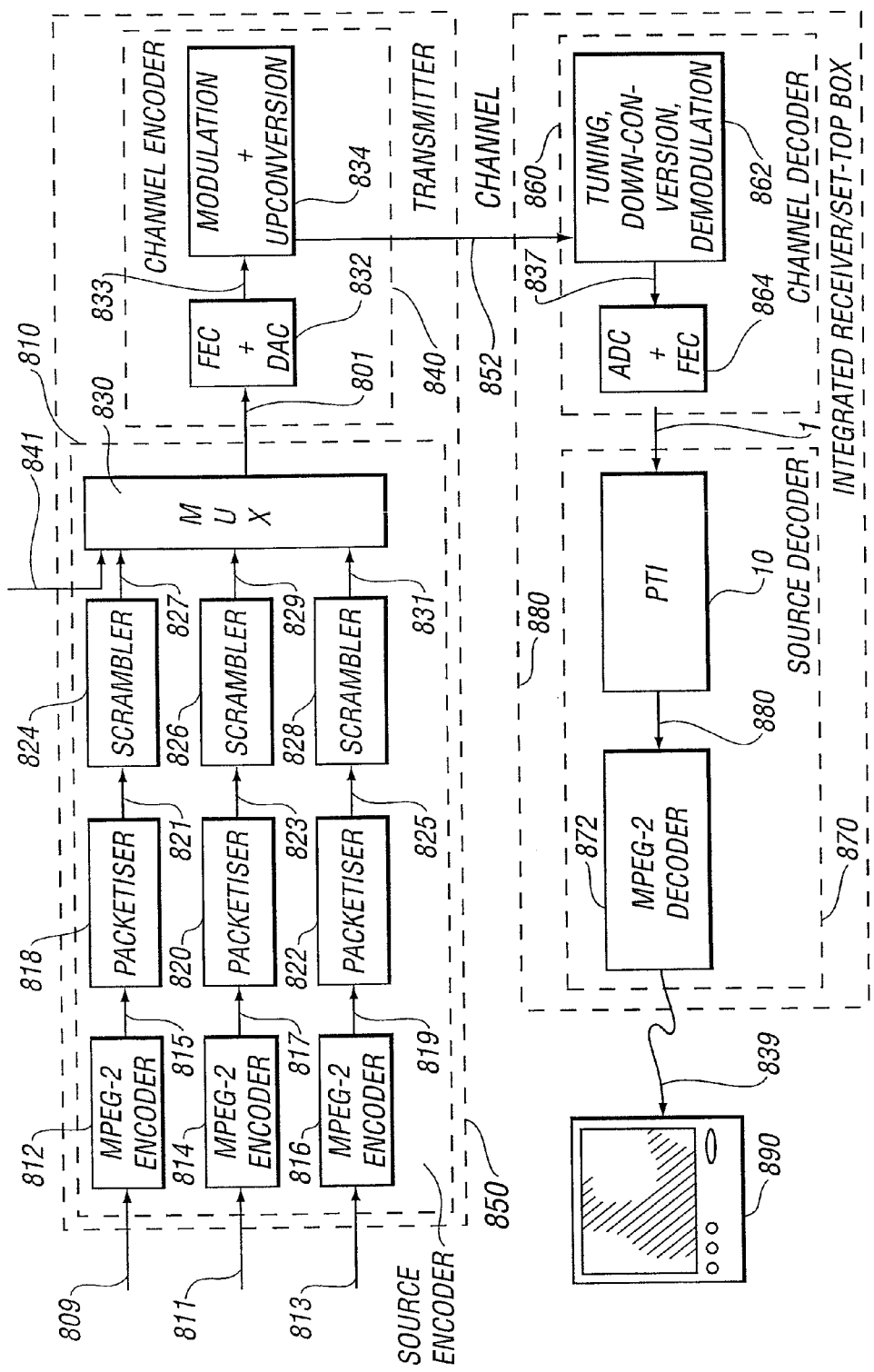
FIG. 6 illustrates a digital broadcast system incorporating the system embodying the present invention.

FIG. 6 illustrates how digital television signals 809, 811 and 813 can be transmitted via a cable, satellite or terrestrial television channel 852 and be viewed on a television 890. The first, second and third television signals 809, 811 and 813 each represent the audio and video signals necessary to recreate a television program for input to a television. The digital television signals 809, 811 and 813 are source encoded and channel encoded by a transmitter 850 to produce a modulated analogue signal for transmission on the channel 852. An integrated receiver decoder (also known as a set top box 880) receives the modulated analogue signal from the channel 852 and produces a video signal 839 which operates the television 890.

The operation of the transmitter 850 will now be explained. The transmitter includes a source encoder 810 and a channel encoder 840. The source encoder includes first, second and third MPEG 2 encoders 812, 814 and 816, first, second and third packetisers 818, 820 and 822, first, second, and third scramblers 824, 826 and 828 and a multiplexer 830.

First, second and third MPEG-2 encoders respectively receive first 809, second 811 and third 813 television signals and encode the signals to produce first, second and third elementary bit streams 815, 817 and 819. The first 818, second 820 and third 822 packetisers respectively receive first 815, second 817 and third 819 elementary bit streams and packetise the elementary bit streams to produce first, second and third packetised elementary bit streams (PES) 821, 823 and 825. The packetising of an elementary bit stream includes creating series of packets which contain a packet head and a data portion, but which do not have any fixed length. The first, second and third scramblers respectively receive first, second and third packetised elementary bit streams and produce first, second and third scrambled packetised elementary bit streams. Each of the scramblers scrambles only the data portion of each packetised elementary bit stream it receives and does not scramble the packet header.

The multiplexer 830 receives as inputs packetised sections of tables on line 841 and the first, second and third scrambled PES 827, 829 and 831 and produces a transport stream from one of its inputs on line 801. The packetised sections with tables 841 contain information which allows the set top box 880 to effect source decoding and produce the video signals 839. The information is stored in a tabular form where each table contains a number of sections and each section is transmitted individually.

The multiplexer 830 produces the transport stream 801 such as that illustrated in FIG. 1. The transport stream includes a number of transport packets with each transport packet containing a transport header 4 and a transport packet payload 6. Transport packets have a fixed length. In the MPEG-2 digital video broadcast (DVB) standard the transport packet is 188 bytes in length. Transport packets are shorter in length than the packets in the packetised elementary stream. Consequently a packet from the first scrambled PES 827 will be spread over a number of transport packets and these transport packets will be multiplexed with the transport packets derived from the packetised sections in tables 841 and the second and third scrambled PES 829, 831. The transport stream is then supplied on line 801 to the channel encoder 840 to produce the modulated analogue signal for transmission on the channel 852.

The channel encoder 840 includes a circuitry 832 for forward error correcting (FEC) the transport stream on line 801 and a digital to analogue converter for converting the signal from the digital to analogue domain to produce an analogue signal 833. The analogue signal 833 is modulated and up converted to a transmission frequency by the circuitry 834 to produce the modulated analogue signal which is then transmitted into the channel 852.

The operation of the set top box 880 will now be described. The set top box includes the system of FIG. 2 but for the purposes of clarity not all of the elements of that figure are shown. The set top box 880 includes a channel decoder 860 and a source decoder 870. The channel decoder 860 receives a modulated analogue signal on the channel 852 and produces the transport stream 1 which it supplies to the source decoder 870. The channel decoder 860 includes circuitry 862 for tuning to the modulated analogue signal on the channel 852 and for down converting and demodulating the modulated analogue signal on the channel 852 to produce an analogue signal 837. The analogue signal 837 is converted from analogue to digital in an analogue to digital converter and forward error corrected by the circuitry 864 to reproduce the transport stream 1.

The source decoder 870 receives the transport stream 1 and produces the video signal 839. The source decoder 870 includes the programmable transport interface 10 and MPEG-2 decoder 872. The PTI 10 (only one of which is shown for clarity) demultiplexes the transport stream 1, selects the transport packets 2 carrying information relating to a particular television program, and descrambles the selected transport packet to produce a data output stream 880, which is in fact the packetised elementary bit stream associated with the selected television program. It should be appreciated that the transport stream may not have been received via a cable or satellite connection and may have been received by the software register 204. The MPEG-2 decoder 872 receives the data output stream 880 and produces the video signal 839 which is supplied to the television 890. The television 890 displays the selected program.

Whilst the preferred embodiments of the present invention have included three programmable transport interfaces, alternative embodiments may include more or less than this number of interfaces. Some embodiments of the present invention may not receive transport streams from cable, satellite or the like and may only receive an input via the software register input. A plurality of software registers 204 may be provided in some embodiments of the present invention.

The invention claimed is:

1. A system comprising:
    at least one first input component for receiving a first transport stream from an external source;
    at least one second input component for receiving a second transport stream from a memory; and
    at least one multiplexer for connecting the at least one first input component and the at least one second input component to an interface which is arranged to provide an output stream to a decoder; wherein the at least one second input component comprises:
        a configuration register comprising a software configuration value used to indicate to the interface that a predetermined amount of data is available to be output from a buffer in a software writable transport stream register, and
    the software writable transport stream register comprising a pace counter that controls a stream data rate of transfer of the second transport stream from the memory to the interface so that the transport stream is re-playable via at least fast forward and rewind, wherein:
        when the pace counter matches the software configuration value, a valid signal is asserted for one system clock cycle and provided to the interface,
        the valid signal indicates that at least one byte read from the buffer is valid, and
        the amount of cycles between each valid byte output by the at least one second input component is programmed in the pace counter.

2. The system as claimed in claim 1, wherein said at least one second input component from memory comprises a transport stream.

3. The system as claimed in claim 1, wherein, when a predetermined amount of space in the buffer is available, a software request flag is asserted.

4. The system as claimed in claim 1, wherein said buffer comprises a first-in-first out (FIFO) buffer.

5. The system as claimed in claim 1, wherein half the size of the buffer equals a bit rate of the data input to the at least one second input component multiplied by a time it takes to read the data from the memory and write the data to the at least one second input component.

6. The system as claimed in claim 1, wherein the software writable transport stream register is provided in said at least one second input component to convert a serial stream of data into a parallel stream of data.

7. The system as claimed in claim 1, wherein said memory is external to said system.

8. The system as claimed in claim 1, wherein said memory is in said system.

9. The system as claimed in claim 1, wherein said memory comprises at least one of CD-ROM, hard disk, floppy disk, CPU, and RAM.

10. The system as claimed in claim 1, wherein said at least one first input component is arranged to receive a transport stream from a cable or satellite link.

11. The system as claimed in claim 1, wherein said at least one second input component comprises a clock, said clock providing a clock signal for controlling the output of data to said at least one second input component.

12. The system as claimed in claim 1, wherein said at least one second input component is arranged to output valid data only.

13. The system of claim 1, wherein the at least one second input component provides an output to the interface in such a form that the interface is not able to determine if the output comes from the external source or from the memory.

14. An integrated circuit comprising:
    at least one first input component for receiving a first transport stream from an external source;
    at least one second input component for receiving a second transport stream from a memory; and
    at least one multiplexer for connecting the at least one first input component and the at least one second input component to an interface which is arranged to provide an output stream to a decoder; wherein the at least one second input component comprises:
- a configuration register comprising a software configuration value used to indicate to the interface that a predetermined amount of data is available to be output from a buffer in a software writable transport stream register, and
- the software writable transport stream register comprising a pace counter that controls a stream data rate of transfer of the second transport stream from the memory to the interface so that the transport stream is re-playable via at least fast forward and rewind, wherein:
  - when the pace counter matches the software configuration value, a valid signal is asserted for one system clock cycle and provided to the interface,
  - the valid signal indicates that at least one byte read from the buffer is valid, and
  - the amount of cycles between each valid byte output by the at least one second input component is programmed in the pace counter.

15. The integrated circuit of claim 14, wherein the at least one second input component provides an output to the interface in such a form that the interface is not able to determine if the output comes from the external source or from the memory.

16. A set top box comprising:
- at least one first input component for receiving a broadcast transport stream from an external source;
- at least one second input component for receiving a transport stream from a memory; and
- at least one multiplexer for connecting the at least one first input component and the at least one second input component to an interface which is arranged to provide an output stream to a decoder; wherein at least one the second input component comprises:
- a configuration register comprising a software configuration value used to indicate to the interface that a predetermined amount of data is available to be output from a buffer in a software writable transport stream register, and
- the software writable transport stream register comprising a pace counter that controls a stream data rate of transfer of the transport stream from the memory to the interface so that the transport stream is re-playable via at least fast forward and rewind, wherein:
  - when the pace counter matches the software configuration value, a valid signal is asserted for one system clock cycle and provided to the interface,
  - the valid signal indicates that at least one byte read from the buffer is valid, and
  - the amount of cycles between each valid byte output by the at least one second input component is programmed in the pace counter.

17. The set top box of claim 16, wherein the at least one second input component provides an output to the interface in such a form that the interface is not able to determine if the output comes from the external source or from the memory.

* * * * *